INVENTOR
R. A. RICHARDS
BY [signature]
ATTORNEY

Nov. 5, 1963 R. A. RICHARDS 3,109,889

PRINTED CIRCUIT APPARATUS

Filed Dec. 29, 1960 2 Sheets-Sheet 2

INVENTOR
R. A. RICHARDS

BY [signature]

ATTORNEY

United States Patent Office 3,109,889
Patented Nov. 5, 1963

3,109,889

PRINTED CIRCUIT APPARATUS

Ronald A. Richards, Cambridge, Mass., assignor to Bell Telephone Laboratories, Incorporated, New York, N.Y., a corporation of New York Filed Dec. 29, 1960, Ser. No. 79,457
3 Claims. (Cl. 178—6.7)

The present invention relates to printed circuits and in particular to apparatus for producing printed circuit masters.

Although printed circuit masters having a one-to-one scale are sometimes produced directly, they are more often produced by first making a large-scale master and then reducing the large-scale master by photographic techniques. This latter procedure generally results in more accurate one-to-one scale masters than when producing such masters directly. The art work required to produce the original masters when using either procedure is, however, very tedious and time consuming and has placed a restraint on the manufacturing of printed circuits.

An object of the present invention is to produce acceptable printed circuit masters more quickly than heretofore possible.

This and other objects are achieved in accordance with the present invention through the use of apparatus that produces printed circuit masters from drawings comprising only the center lines of the paths and lands of the desired printed circuits. More broadly stated, the present invention produces broad-lined drawings from thin-lined drawings.

In one of its broader aspects, the invention takes the form of apparatus that scans drawings in a line-by-line manner with a circular scanning spot having a diameter less than the nominal distances between the scanning lines. A threshold sensing action produces a first signal when less than a predetermined amount of the spot is within markings on the drawings while a second signal is produced when more than the predetermined amount of the spot is within the markings. Recordings are produced in a line-by-line manner with a circular recording spot which is responsive to the first and second signals and has a diameter greater than the nominal distance between the recording lines. When the markings on the drawings comprise lines, the lines produced on the recordings are wider than those on the drawings as a result of both the threshold sensing action and the size of the recording spot.

One embodiment of the present invention includes a facsimile transmitter having a circular scanning spot. As the circular spot sweeps into and then out of a line, the output from the transmitter changes in a continuous manner from a first signal level to a second signal level and then back to the first signal level. The circular scanning spot, as explained subsequently, causes the width of a scanned line to appear the same in the transmitter output for all slopes of the scanned line. The transmitter output is applied to a threshold circuit which produces a first output when the transmitter output is below a predetermined level and a second output when the transmitter output is above the predetermined level. In accordance with a feature of the invention, the threshold circuit outputs may be made to represent different line widths by changing the predetermined level of the threshold circuit. The threshold circuit outputs are applied to a facsimile receiver having a circular recording spot which, in accordance with another feature of the invention, has a diameter greater than the nominal distances between the recording lines of the receiver. This feature of the invention causes lines to be produced at the receiver which are wider than the line widths indicated by the threshold circuit outputs. The lines produced at the receiver are therefore wider than those scanned at the transmitter as a result of both the threshold circuit and the large recording spot.

The centerline or thin-lined drawings for use with embodiments of the invention may be drawn by various media. Thin-lined pencil drawings have, for example, been found to be satisfactory.

Embodiments of the invention may be used to produce either one-to-one scale or large-scale printed circuit masters. One-to-one scale masters may be produced, for example, from centerline drawings having the same overall dimensions as the desired one-to-one scale masters. By taking advantage of the inherent size reducing characteristics of facsimile apparatus, one-to-one scale masters may be produced from centerline drawings having overall dimensions greater than those of the desired one-to-one scale masters. Furthermore, large-scale masters may be produced from centerline drawings having overall dimensions greater than those of the desired one-to-one scale masters. These large-scale masters may then be reduced photographically. The particular approach used to produce a desired one-to-one scale master will depend, among other things, upon the printed circuit involved and the apparatus being used.

The present invention may also be used in a manner to take advantage of several well known features of facsimile apparatus. The electrical input to the receiver may, for example, be stored for future use. Furthermore, the electrical input to the receiver may be transmitted to another location, thus eliminating the necessity of mailing printed circuit masters.

Other objects and features of the invention will become apparent from a study of the following detailed description of an embodiment.

Figure 1:
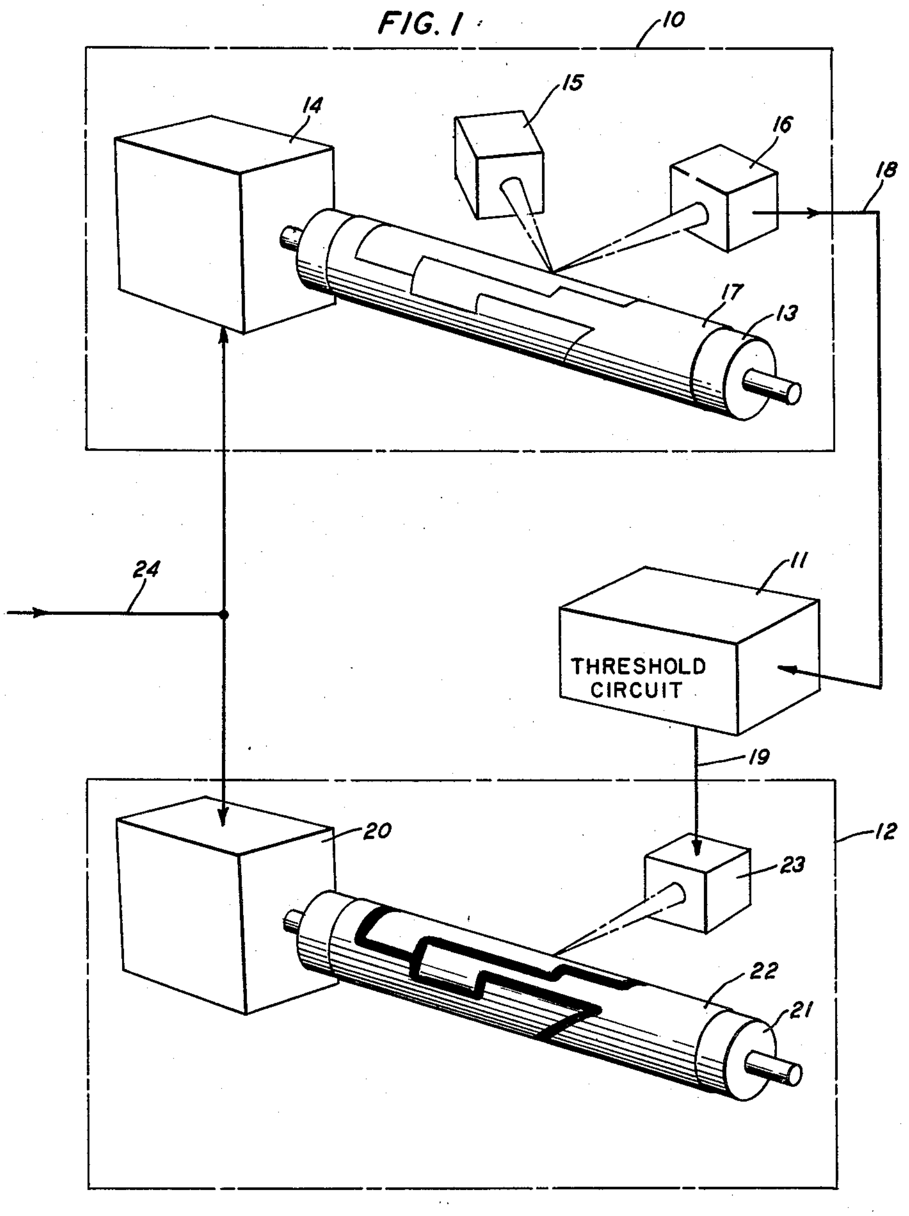
FIG. 1 is a pictorial representation of an embodiment of the invention.

The embodiment of FIG. 1 comprises a facsimile transmitter 10, a threshold circuit 11 and a facsimile receiver 12. Only the elements of transmitter 10 and receiver 12 necessary for the present explanation are shown. Transmitter 10 comprises a copy holding drum 13, a drum driving mechanism 14, an illumination circuit 15 and a reflected light sensing circuit 16. A centerline drawing 17 of the printed circuit master to be produced is shown around drum 13. Illumination circuit 15 produces a circular scanning spot that is caused to scan drawing 17. Reflected light sensing circuit 16 scans drawing 17 in synchronism with illumination circuit 15 and produces on lead 18 an output related to the intensity of the light reflected from drum 17.

Lead 18 is connected to the input of threshold circuit 11. Threshold circuit 11 produces on a lead 19 a first output when the output from reflected light sensing circuit 16 is below a threshold level and a second output when the output from circuit 16 is above the threshold level. Threshold circuit 11 may comprise a reverse biased active device that is switched from an OFF or non-conducting condition to an ON or fully-conducting condition when the input to the device exceeds the bias. Such circuits are well known in the art.

Receiver 12 comprises a drum driving mechanism 20, a drum 21 on which is mounted recording medium 22 and a recorder circuit 23. A lead 24 applies inputs to drum driving mechanism 20 and drum driving mechanism 14 of transmitter 10 so that drums 13 and 21 are driven in synchronism. Lead 19 from threshold circuit 11 is connected to recorder circuit 23. Recorder circuit 23 scans recording medium 22 in synchronism with the scanning action of illumination circuit 15 and sensing circuit 16 of transmitter 10. Recorder circuit 23 produces a recording spot on medium 22 for only one of the threshold circuit outputs appearing on lead 19.

Figures 2A, 2B, 2C, 2D, 2E:
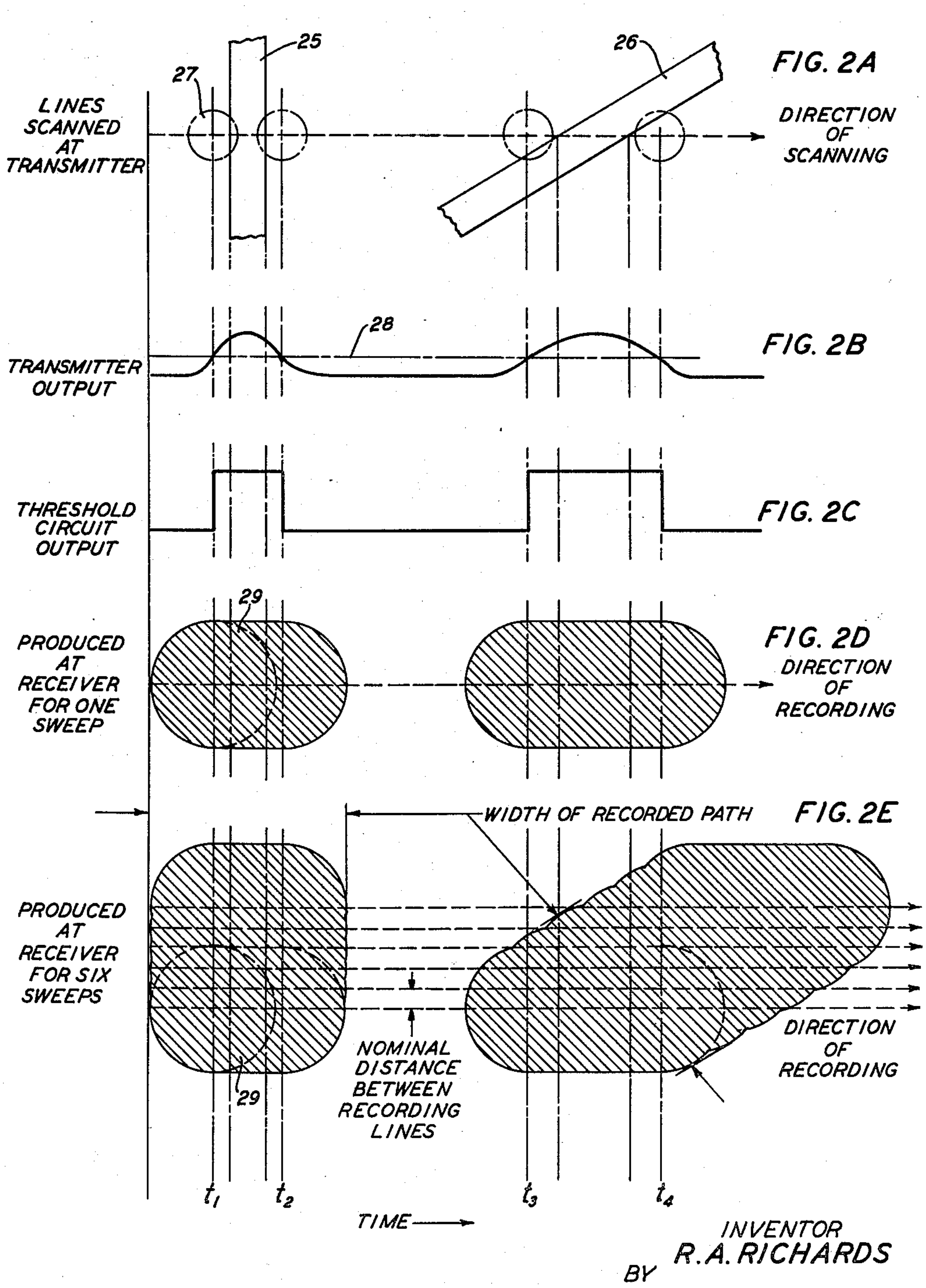
FIGS. 2A through 2E show various sketches useful in understanding the operation of the embodiment of FIG. 1.

A more detailed explanation of the operation of the embodiment of FIG. 1 is now presented in conjunction with FIGS. 2A through 2E. FIGS. 2A through 2E all have the same time base. FIG. 2A shows greatly magnified portions of a vertical line 25 and a sloping line 26 from a typical thin-lined drawing that may be placed on drum 13 of transmitter 10. A circular scanning spot 27 which has a diameter less than the nominal distances between scanning lines and scans from left to right is shown at times $t_1$, $t_2$, $t_3$ and $t_4$ during one of its sweeps. FIG. 2B is the waveform of the output from transmitter 10 as spot 27 of FIG. 2A makes one sweep through lines 25 and 26. The amplitude of the waveform increases to a maximum level as spot 27 sweeps into each of lines 25 and 26, holds this maximum level while the spot is within the lines and decreases to its initial level as the spot sweeps out of the lines. As shown in FIG. 2C when the amplitude of the transmitter output waveform is less than a threshold level 28, threshold circuit 11 produces a first output whereas when the amplitude of the transmitter output waveform exceeds threshold level 28, threshold circuit 11 produces a second output. As shown in FIG. 2C, threshold circuit 11 switches from its first output to its second output at times $t_1$ and $t_3$ and from its second output to its first output at times $t_2$ and $t_4$. In accordance with a feature of the invention, the times at which threshold circuit 11 switches from one output to another may be changed by adjusting the threshold control of the circuit. This feature permits the threshold circuit outputs to represent greater line widths than those scanned by the transmitter.

The two shaded areas shown in FIG. 2D represent those areas of the receiver recording medium that are swept by a recording spot 29 as a result of the threshold circuit output shown in FIG. 2C. In FIG. 2E the shaded areas represent those areas of the recording medium that are swept by spot 29 as a result of six consecutive sweeps of spot 27 through lines 25 and 26 of FIG. 2A. In accordance with a feature of the invention, spot 29 is circular and has a diameter greater than the nominal distances between recording lines. The widths of the lines produced on the recording medium are equal to $$2\left(\frac{W}{2}+f+\frac{D}{2}\right) \text{ or } D+W+2f$$

where W is the width of the line being scanned at the transmitter, $f$ is the perpendicular distance from the edge of the line being scanned to the center of the scanning spot at the time threshold circuit 11 changes its output condition and D is the diameter of the recording spot. Because spot 27 is circular, the perpendicular distance from the edge of a line of any slope to the center of the spot at the time threshold circuit 11 changes its output condition is always the same. This expression therefore represents the width of a line of any slope. Furthermore the lines appearing on the recording medium are $(D+2f)$ wider than the scanned lines. The width of the recorded lines may be increased or decreased in accordance with features of the invention by changing the diameter of the recording spot or the threshold level of circuit 11.

As apparent in FIG. 2E the edge of the lines appearing on the recording medium have a slight ripple. This ripple decreases when the ratio of the recording spot diameter to the nominal distances between recording lines is increased. The ripple, however, is generally within acceptable limits.

The above explanation is related to the producing of a broad-lined drawing having the same overall dimensions as those of the thin-lined drawing from which it is made. When size reduction is produced by the facsimile apparatus, the thickness of the lines produced on the recording medium are equal to $D+K(W+2f)$ where K is the reducing factor of the facsimile apparatus.

The invention has been described only with respect to a particular embodiment. It is to be understood that various other embodiments may be devised by those skilled in the art without departing from the spirit and scope of the invention.

What is claimed is:

1. In combination, means for scanning a sheet of markings in a line-by-line manner and producing signals indicative of said markings, means responsive to said signals for producing a first output when said signals have an amplitude less than a predetermined level and a second output when said signals have an amplitude greater than said predetermined level, and means responsive to said first and second outputs for recording in a line-by-line manner with a circular recording spot having a diameter greater than the nominal distances between the recording lines.

2. In combination, means for scanning a sheet of markings in a line-by-line manner with a circular scanning spot having a diameter less than the nominal distances between the scanning lines to produce signals indicative of said markings, means responsive to said signals for producing a first output when said signals have an amplitude less than a predetermined level and a second output when said signals have an amplitude greater than said predetermined level, and means responsive to said first and second outputs and synchronized with said scanning means for recording in a line-by-line manner with a circular recording spot having a diameter greater than the nominal distances between the recording lines.

3. In combination, a facsimile transmitter that scans in a line-by-line manner with a circular scanning spot, means responsive to the output from said transmitter for producing a first output when said transmitter output is less than a predetermined level and a second output when said transmitter output is greater than said predetermined level, and a facsimile receiver responsive to said first and second outputs and synchronized with said transmitter for recording in a line-by-line manner with a circular recording spot having a diameter greater than the nominal distances between the recording lines.

References Cited in the file of this patent

UNITED STATES PATENTS

| | | |
|---|---|---|
| 1,924,700 | Thilo | Aug. 29, 1933 |
| 2,545,463 | Hester | Mar. 20, 1951 |
| 2,551,726 | Cooley | May 8, 1951 |